United States Patent [19]

Dehne

[11] 3,969,954
[45] July 20, 1976

[54] INDEX DRIVE SYSTEM CAM FOLLOWER ASSEMBLY

[76] Inventor: Wilfried E. Dehne, 14405 Lombard, Berwyn, Ill. 60402

[22] Filed: June 23, 1975

[21] Appl. No.: 589,039

[52] U.S. Cl. .................................. 74/569; 74/84 R; 308/207 A
[51] Int. Cl.² ......................................... F16H 53/06
[58] Field of Search ..................... 74/569, 84, 125; 308/207 A, 207 R

[56] References Cited
UNITED STATES PATENTS

| | | | |
|---|---|---|---|
| 2,081,390 | 5/1937 | Trapp | 74/569 |
| 2,986,949 | 6/1961 | Lancaster et al. | 74/84 |
| 3,525,268 | 8/1970 | Kenny | 74/84 |
| 3,572,173 | 3/1971 | Woltjen | 74/84 X |

*Primary Examiner*—Benjamin W. Wyche
*Assistant Examiner*—F. D. Shoemaker

[57] ABSTRACT

In an index drive system in which a cam follower is yoke mounted in a wheel for rotation with a shaft, to engage a cam plate, a cylindrical cam follower bearing surface or tire is trunion-mounted, with trunions projecting laterally from and beyond opposite sides of the cam follower bearing surface or tire and journalled in antifriction bearings supported by the wheel.

7 Claims, 5 Drawing Figures

INDEX DRIVE SYSTEM CAM FOLLOWER ASSEMBLY

BACKGROUND OF THE INVENTION

The limiting factor to high speed operation of index mechanisms is the load-carrying capacity of the cam followers. Cam followers have conventionally been either cantilevered, as shown, particularly in FIG. 2 of, and described in U.S. Pat. No. 2,986,949, or they have been yoke mounted, as shown, particularly in FIG. 2 of, and described in U.S. Pat. No. 3,525,268, but in either event, a cam follower roller has been mounted on antifriction bearings on a supporting shaft which has been fixd against rotation itself.

In existing designs, sleeve or needle bearings are used as the antifriction means. An increase of capacity is then a function of follower diameter and length, both of which increase size and weight of the follower, which is largely self-defeating.

One of the objects of this invention is to provide a cam follower and mounting which substantially increases the capacity of the follower without substantially increasing the size, weight, or radius of gyration of the follower mechanism.

Another object is to provide such a construction which is simple and economical.

Other objects will become apparent to those skilled in the art in the light of the following description and accompanying drawings.

SUMMARY OF THE INVENTION

In accordance with this invention, generally stated, in an index drive system wherein a cam follower is yoke mounted in a wheel for rotation with a shaft, to engage a cam plate mounted for rotation with a second shaft, a cam follower bearing surface or tire is trunion-mounted, with trunions projecting laterally from and beyond opposite sides of the follower bearing surface or tire and journalled in antifriction bearings supported by the yoke. In the preferred embodiment, the cam follower bearing surface is integral with the trunions, and of a diameter no greater than the outside diameter of the bearings.

DESCRIPTION OF THE PREFERRED EMBODIMENTS

Figure 2:
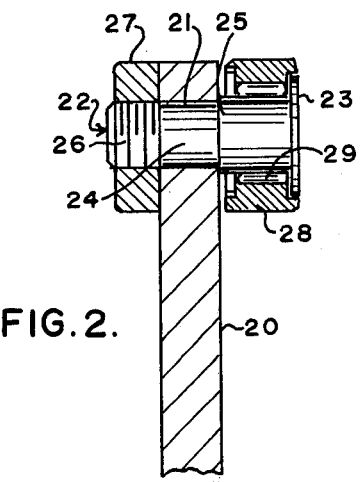
FIG. 2 is a section view illustrating a conventional cantilevered cam follower construction.
Figure 3:
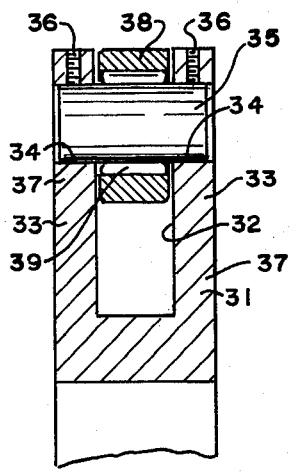
FIG. 3 is a sectional view showing a conventional yoke mounted cam follower construction.

As has been indicated above, cam followers have heretofore been mounted on fixed shafts. Such followers are illustrated in FIGS. 2 and 3. In FIG. 2, a follower plate 20 is provided with a transverse hole 21 through which a reduced part 24 of a shaft 22 extends. The shaft 22 has a shoulder 25 which engages one side of the wheel 20, a threaded end section 26 upon which a retaining nut 27 is mounted, and a radially outwardly extending flange 23 at its end opposite the threaded end 26. A cam follower roller 28, mounted on antifriction bearings 29, is mounted on the shaft between the flange 23 and a flat face of the wheel 20.

In FIG. 3, a wheel 31 is formed with spaced integral flanges 37, parallel inner walls 33 of which define a channel 32. Transverse, axially aligned holes 34 extend through the flanges 37. A shaft 35, held in place by set screws 36, supports a roller 38 mounted on antifriction bearings 39.

Figure 1:
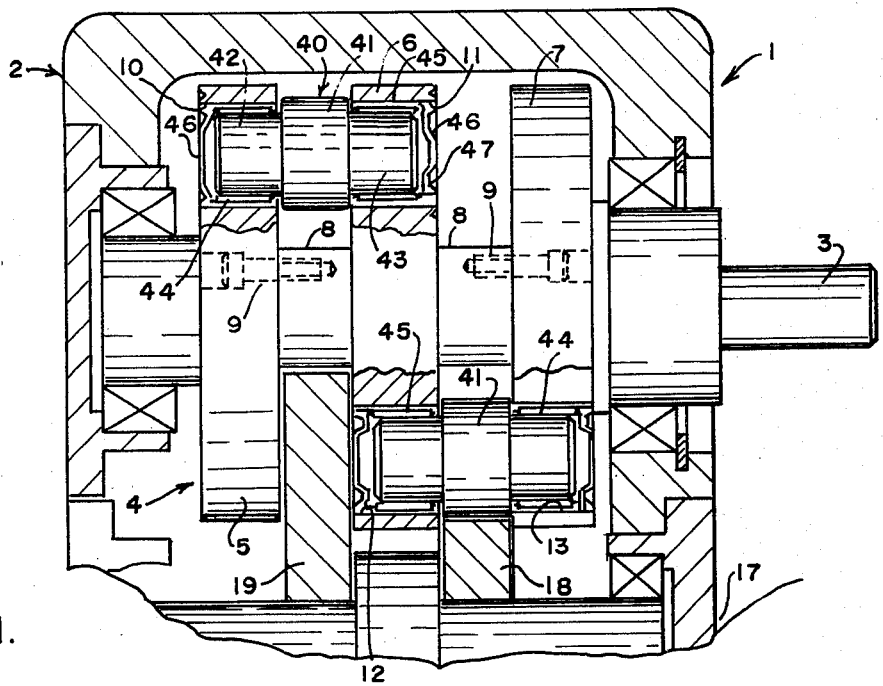
FIG 1 is a fragmentary sectional view, partly broken away, showing one embodiment of index drive system cam follower assembly of this invention.

Referring now to FIG. 1, for one illustrative embodiment of this invention, reference numeral 1 indicates an index drive system, including a conventional case 2, and an output shaft 3 with a cam follower wheel assembly 4 keyed to it for rotation therewith. A description of an illustrative example of general construction of the wheel 4, as far as configuration of the wheel and the numbers and relative orientation of cam followers and the like details can be found in U.S. Pat. No. 3,525,268, the particular configuration of the wheel, numbers and relative orientation of the followers and the like details constituting no part of this invention.

The index drive system also includes an input shaft 17 on which cam plates 18 and 19 are mounted. These are conventional and an illustrative example thereof can also be found in U.S. Pat. No. 3,525,268.

The wheel assembly of the embodiment shown in FIG. 1 is made up of three flanges 5, 6 and 7. Flange 5 has an opening 10 extending transversely through it near its perimeter. Flange 7 has an opening 13 extending transversely through it near its perimeter. Flange 6 has openings 11 and 12 through it, axially aligned with the openings 10 and 13, respectively. In this embodiment, the flange 6 has hubs 8 integral with it, and the flanges 5 and 7 are mounted to the hubs 8 by means of stud bolts 9.

In this embodiment, cam followers 40 are made up of a tire 41 and trunions 42 and 43, projecting from either side of the tire 41 and integral therewith. The trunions 42 and 43 are journalled in outboard roller bearings 44 and inboard roller bearings 45. The rollers bearings 44 are mounted in the openings 10 and 13, respectively, of flanges 5 and 7, and the roller bearings 45, in the openings 11 and 12 in the flange 6. They are provided with closures 46 held in place by staking 47.

It will be seen that in this embodiment, the tire or cam follower bearing surface 41 is of greater diameter than the openings 10, 11, 12 and 13. This necessitates the use of separable flange members to permit the mounting of the cam follower.

Figure 4:
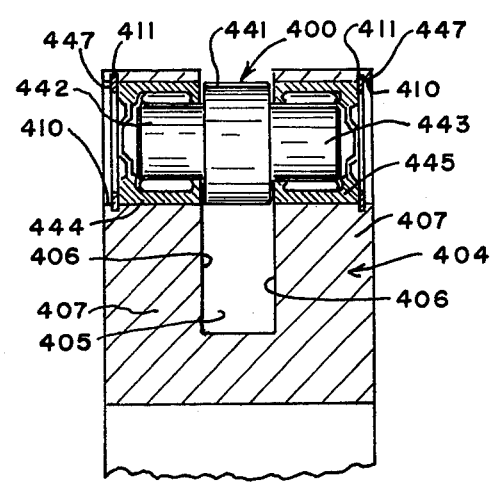
FIG. 4 is a sectional view illustrating another embodiment of cam follower assembly of this invention.
Figure 5:
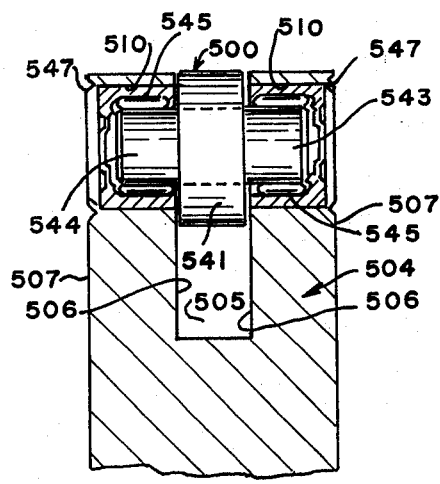
FIG. 5 is a sectional view of still another embodiment of cam follower assembly of this invention.

In FIGS. 4 and 5, two embodiments of cam follower are illustrated which permit the use of a one-piece wheel assembly. FIG. 4 illustrates the preferred embodiment of this invention. In this embodiment, a cam follower wheel 404 is formed with spaced integral flanges 407, parallel inner walls 406 of which define a channel 405. Axially aligned openings 410 extend through the flanges 407. An annular groove 411 is formed on the inside surface of each opening. A cam follower 400, has a cylindrical tire 441 and integral with it, trunions 442 and 443 projecting from opposite sides of the tire 441. The trunions 442 and 443 are journalled in antifriction bearings 444 and 445, which are retained against axially outward movement by snap rings 447 seated in the grooves 411. While only two flanges are shown, three or more can be provided, as in FIG. 1.

It will be seen that in this embodiment, the diameter of the openings 410 is slightly greater than the diameter of the tire 441, so that the follower can be inserted from either side. While in the particular embodiment shown, the tire 441 is of greater diameter than that of the trunions 442 and 443, it can be of the same diameter, in which case the tire is indistinguishable, except for its position, from the trunions, or it can even be smaller in diameter than the trunions. Similarly, the outside diameter of the bearing can be substantially greater than that of the tire, or, if the tire is of greater diameter than the bearing, at least one of the openings accessible from an outer side can be made of greater diameter than the tire to accommodate the passage of the tire and then bushed to accommodate the bearing.

In the embodiment shown in FIG. 5, a cam wheel 504 is formed with spaced, integral flanges 507, parallel inner walls 406 of which define a channel 505. Axially aligned openings 510 extend transversely through the flange 507. A cam follower 500 has a tire 541, from either side of which trunions 543 and 544 project and are journalled in roller bearings 545 mounted in the openings 510 and retained by staking 547. In this embodiment, the tire 541 is of substantially greater diameter than the diameter of the openings 510. The tire 541 is annular, and is press fit while in place in the channel 505 onto a shaft the ends of which constitute the trunions 543 and 544.

It can be seen that in all of the embodiments, the bearing capacity is at least double the bearing capacity of conventional roller type cam followers as illustrated in FIGS. 2 and 3. Furthermore, the increased bearing capacity has been obtained without any increase in the size of the cam follower itself or the cam follower wheel, and has entailed little or no increase in total weight, since the weight of the extra bearing is to some extent offset by the weight of metal removed from the wheel to accommodate the larger diameter of the bearings as compared with the shaft of the embodiment shown in FIG. 3, for example.

Numerous variations in the construction of the cam follower assembly of this invention, within the scope of the appended claims, will become apparent to those skilled in the art in the light of the foregoing disclosure. Merely by way of example, the number and location of the cam followers can be varied. The configuration of the tire or cylindrical bearing section and the trunions can be changed; different types of bearings can be used, the term "antifriction bearing" being intended to embrace any suitable bearing, and different means of retaining the bearing and positioning the cam follower can be employed. While the integral construction is preferred, an annular tire can be secured to a shaft in any desired way, but in any event, integral or secured, the tire and trunions are fixed to one another against rotation with respect to one another and the term "fixed" is used to embrace both types. These variations are merely illustrative.

Having thus described the invention, what is claimed and desired to be secured by Letters Patent is:

1. In an index drive system wherein a cam follower is yoke mounted in a wheel to engage a cam plate, the improvement comprising a cam follower tire and trunions concentric with, fixed to, and projecting from either side of said tire and journalled in antifriction bearings carried by said wheel.

2. The improvement of claim 1 wherein the trunions and tire are integral with one another.

3. The improvement of claim 1 wherein the said wheel has flanges with axially aligned holes through them, and said antifriction bearings are seated in said holes.

4. The improvement of claim 1 wherein the tire is of no greater diameter than the greatest outside diameter of the antifriction bearings.

5. The improvement of claim 3 wherein the tire is of greater diameter than the greatest outside diameter of the antifriction bearings, and is in the form of an annulus fixedly mounted on and intermediate the ends of a shaft, the ends of said shaft projecting from either side of said tire and constituting the said trunions.

6. The improvement of claim 3 wherein the said tire is of a diameter less than at least one of said holes.

7. In an index drive system wherein a cam follower is yoke mounted in a wheel to engage a cam plate, the improvement comprising flanges spaced from one another and forming parts of said wheel, successive of said flanges having axially aligned holes through them, a tire constituting the cam follower cam bearing surface, trunions concentric with, integral with, and projecting from either side of said tire, and antifriction bearings mounted in said openings, said trunions being journalled in said bearings, said tire being of a diameter less than the diameter of at least one of said openings.

* * * * *